United States Patent

[11] 3,562,536

[72] Inventors Rolf H. Brunner;
Ollie C. Woodard, Poughkeepsie, N.Y.

[21] Appl. No. 756,540
[22] Filed Aug. 30, 1968
[45] Patented Feb. 9, 1971
[73] Assignee International Business Machines Corporation
Armonk, N.Y.
a corporation of New York

[54] RADIATION SENSITIVE SEMICONDUCTOR WAFER IDENTIFICATION SYSTEM
8 Claims, 11 Drawing Figs.

[52] U.S. Cl. .......... 250/219, 235/61.11
[51] Int. Cl. .......... G08c 9/06
[50] Field of Search .......... 250/219ID, 236, 219IDC, 219ICR, 209; 174/68.5, 112; 235/61.115

[56] References Cited

UNITED STATES PATENTS

| | | | |
|---|---|---|---|
| 2,295,000 | 9/1942 | Morse .......... | 250/219X |
| 2,820,907 | 1/1958 | Silverman .......... | 250/219X |
| 2,922,894 | 1/1960 | Kerr et al. .......... | 250/219 |
| 2,927,216 | 3/1960 | Lohninger .......... | 250/219X |
| 3,109,933 | 11/1963 | Baumann .......... | 250/236X |
| 3,401,589 | 9/1968 | Druschel et al. .......... | 250/219X |
| 3,446,978 | 5/1969 | Leavens .......... | 250/219 |

FOREIGN PATENTS

| | | | |
|---|---|---|---|
| 1,141,352 | 12/1962 | Germany .......... | 174/68.5 |

*Primary Examiner*—Walter Stolwein
*Attorney*—Sughrue, Rothwell, Mion, Zinn and Macpeak

ABSTRACT: Placement of coded indicia as etched lines in the kerf area of a semiconductor wafer. Scanning and image rotation are used to read out the indicia, which may be binary or frequency coded. Placement of the etched lines at a different angle from the circuit lines allows illumination of the etched lines with minimum interference from the circuit lines.

| FREQUENCY | f4 | f3 | f2 | f1 | f1 | f2 | f2 | f3 | f3 | f2 | f1 | f1 | f2 | f2 | f3 |
|---|---|---|---|---|---|---|---|---|---|---|---|---|---|---|---|
| BINARY INDICATION | – | – | 1 | 0 | 0 | 1 | 1 | – | – | 1 | 0 | 0 | 1 | 1 | – |

INVENTORS
ROLF H. BRUNNER
OLLIE C. WOODARD

BY Sughrue, Rothwell, Mion, Zinn & Macpeak
ATTORNEYS

RADIATION SENSITIVE SEMICONDUCTOR WAFER IDENTIFICATION SYSTEM

BACKGROUND OF THE INVENTION

1.Field of the Invention

This invention concerns the processing of semiconductor wafers, and more particularly the automatic identification of the wafers during the manufacturing process.

2.Description of the Prior Art

Conventional letters and numerals have previously been etched into semiconductor wafers so that a technician could look at a wafer and tell its type without detailed circuit analysis. However, such etching of conventional letters and numerals does not provide easily machine readable coded indicia.

SUMMARY OF THE INVENTION

As integrated circuits come into more common use, their manufacture in large numbers becomes more common. In a fully automated system for manufacture of integrated circuits it becomes necessary to identify automatically the types of semiconductor wafers in the manufacturing process. It is desirable that this automatic identification be done while the wafers are in transport from one processing stage to the next.

Accordingly, this invention is concerned with a wafer having coded indicia thereon in a form which is easily machine readable. The invention is also concerned with a machine to read such indicia from the wafer. Brief Description of the Drawings FIG. 1 illustrates an area of the surface of a conventional integrated circuit wafer.

Figures 6, 7A:
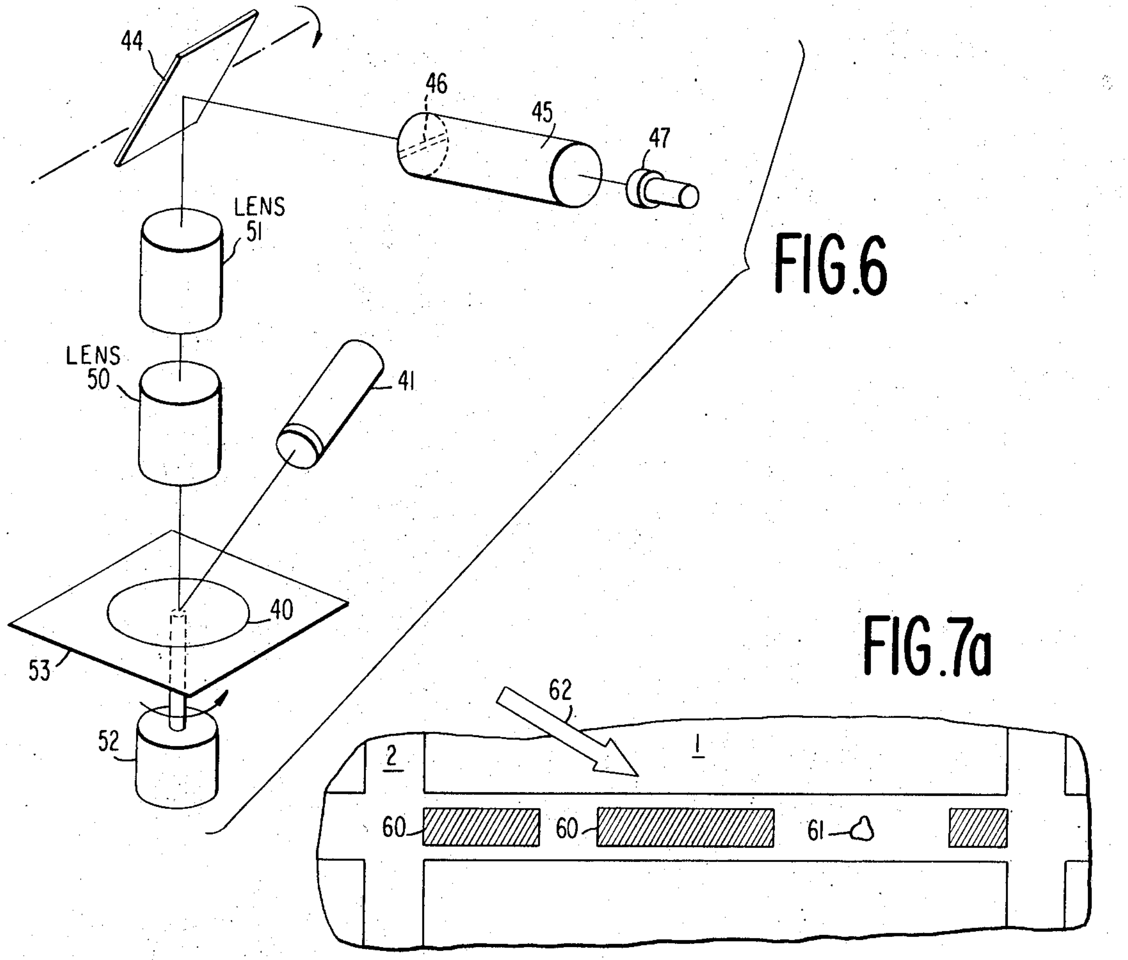
FIG. 6 illustrates a wafer scanning device with mechanical rotation of the wafer image.

FIG. 7*a* illustrates the kerf area of a wafer with binary information thereon.

Figure 7B:
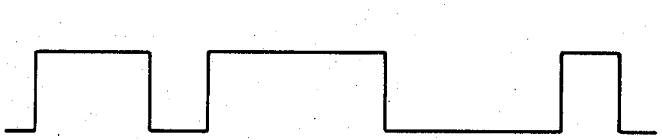
Figure 7C:
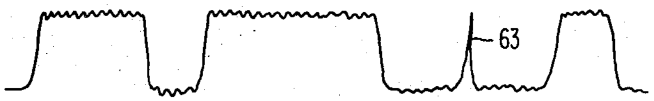

FIGS. 7*b* and 7*c* illustrate response curves of a photosensitive element.

Figure 7D:
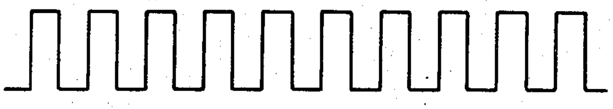

FIG. 7*d* represents timing pulses.

Figure 1:
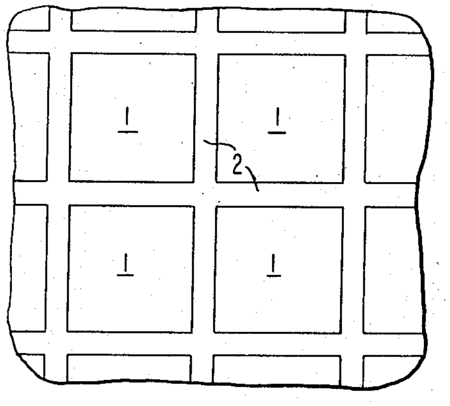
Figure 7E:
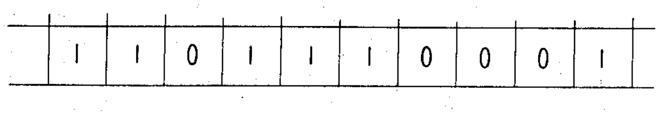

FIG. 7*e* represents digits corresponding to the response curves of FIGS. 7*b* and 7*c*. Description of the Preferred Embodiments FIG. 1 illustrates an area of the surface of a wafer on which a large number of integrated circuits are to be manufactured. The circuits will be manufactured in the areas 1. Between the areas 1 are kerf areas 2. After completion of the manufacturing stages these kerf areas will be cut, in a manner well known in the art, to separate the individual integrated circuits in the areas 1 before the individual integrated circuits are connected for use. Thus, the "real estate" located in the kerf area will be destroyed before the integrated circuits are ready for use.

In this invention the kerf area is used to carry coded indicia for automatic identification of the wafer during the wafer processing steps. After processing is complete, when the coded indicia is no longer needed, the indicia is destroyed together with the kerf area. No prime "real estate" is needed for the coded indicia.

Figure 2:
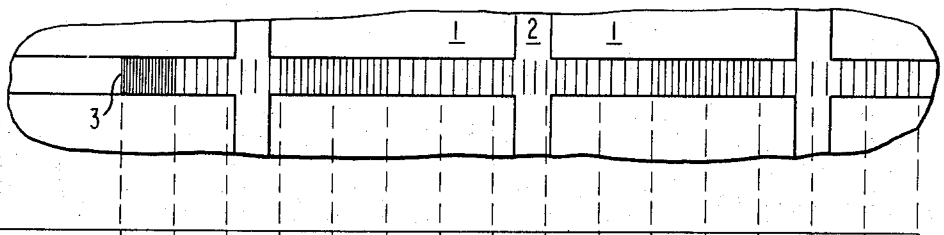
FIG. 2 illustrates the kerf area of a wafer with frequency coded information thereon.

FIG. 2 illustrates one system for placing coded indicia on the kerf area. Lines 3 are etched, using methods of etching well known in the art, into the kerf area in one of four spacing patterns. A smaller or greater number than four patterns could be used; four is chosen for convenience and illustration only. When used with the scanning system explained in later paragraphs, these four patterns act to generate a signal of one of four frequencies, *f*1, *f*2, *f*3 and *f*4.

The system of four patterns for four frequencies, as illustrated, has the advantage that the coded pattern can be read in either direction. Scanning from the left as illustrated will cause the first frequency obtained to be *f*4, but scanning from the right causes the first frequency obtained to be *f*3. The frequency *f*4 is a reference frequency which, when it comes at the beginning of a code readout, can indicate that the readout is taking place in a correct or noninverted direction. The frequency *f*3 is another reference frequency which indicates the beginning and end of the numerical code pulses.

If, upon beginning a scan, the system notes that the first frequency obtained is *f*3, logic elements can be activated to cause the digit code signals which follow to be read out in the inverse order to the order in which they were read in.

Between the *f*3 signals are *f*1 and *f*2 signals which represent binary zeros and ones. If desired, more frequencies could be used to allow the system to operate in a higher base than base two. The coded indicia 3 in FIG. 2 illustrate a system in which the binary number 10011 is repeated once, that is to say the number is present twice. In the leftmost representation of the number, the frequency series *f*2, *f*1, *f*1, *f*2, *f*2 represents the number series 1,0,0,1,1. The rightmost representation repeats the same number series in the same order. This repetition can provide a check for errors.

However, the number representation system can also be designed to operate without repetition, in which case the *f*4, or order indicating frequency, again indicates the direction in which the scanning takes place. It is also possible to use two representations in which the second representation repeats the same number in an inverse numerical order, in which case the *f*4 signal is not needed to indicate the order.

Figure 3:
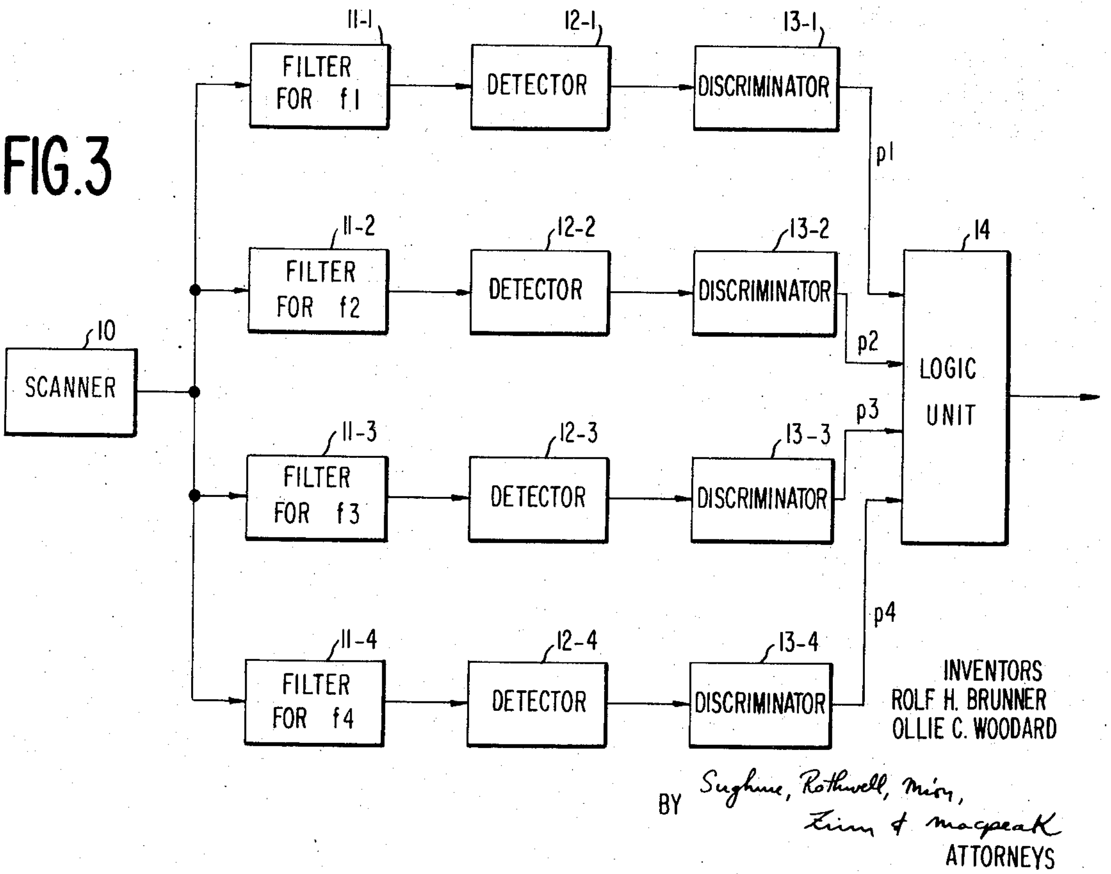
FIG. 3 illustrates, in block form, a system for converging the frequency coded information of FIG. 2 to binary information.

FIG. 3 illustrates, in block diagram form, a circuit for taking the output from scanner 10, later described in more detail, and converting the resulting signals of four frequencies into binary indications *p*1, *p*2, *p*3 and *p*4 respectively corresponding to frequencies *f*1, *f*2, *f*3 and *f*4. For example, in the channel for converting frequency *f*1 into a binary indication *p*1, a band-pass filter 11-1 is provided to pass only frequency *f*1. A detector 12-1 derives the pulse envelope of the signal from the filter output. The detected signal enters discriminator 13-1 which passes the binary signal *p*1 only if the discriminator input is above a certain minimum level. The operation of the other three channels is similar. Signals *p*1 through *p*4 enter logic unit 14 which generates an output signal.

Figures 4, 5:
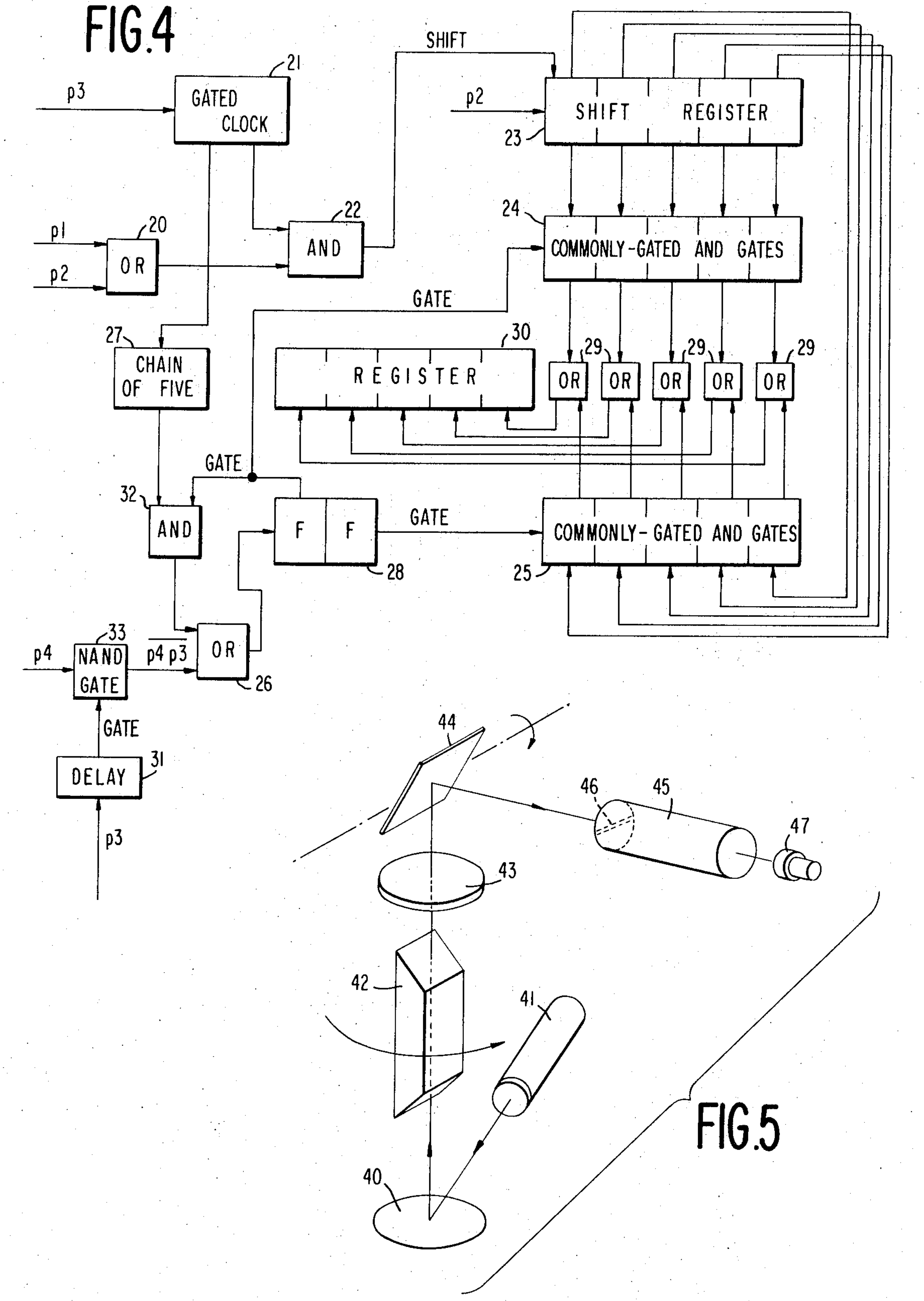
FIG. 4 illustrates a logic circuit which could be used to make the information of FIG. 2 readable in either direction.
FIG. 5 illustrates a wafer scanning device with optical rotation of the wafer image.

FIG. 4 is a block diagram of a logic unit such as unit 14 which could be used with the system. This diagram is shown by way of explanation only and is not part of the invention as such. Many other such logic units could be designed for use with the system. OR gate 20 provides an output whenever there is a *p*1 or a *p*2 signal. Gated clock 21 is gated on by a first *p*3 pulse and off by the next *p*3 pulse. During the interval, clock 21 provides pulses at a predetermined rate. AND gate 22 provides an output pulse to shift the shift register 23 whenever a *p*1 or a *p*2 pulse exists together with a clock pulse. Pulses *p*2 are read into shift register 23 if they exist at the time of each shift.

Data from shift register 23 is gated through commonly gated AND gates 24 in one numerical order and through commonly gated AND gates 25 in the reverse numerical order. AND gates 24 and 25 are arranged to be gated by respective stages of flip-flop 28 to cause data to enter register 30 through OR gates 29 in respectively normal or reverse numerical orders.

Pulses *p*4 pass NAND gate 33 unless immediately preceeded by a pulse *p*3 which is delayed slightly in delay unit 31 to block *p*4 from passing NAND gate 33. Gate 33 prevents operation of the circuit by a *p*4 occurring at the end of a train of numbers and, thus, immediately after *p*3 pulse. A *p*4 pulse operates flip-flop 28 through OR gate 26 to cause AND gates 24 to be gated ON and AND gates 25 to be gated OFF. Such gating will cause numbers to be read into register 30 in normal order. The lack of the *p*4 signal causes AND gates 25 to be gated ON and AND gates 24 to be gated OFF to cause numbers to enter register 30 in reverse order.

A count of five pulses (assuming the illustrated five bits to the wafer identification number) causes chain of five counter 27 to emit a pulse. If a *p4* pulse has caused flip-flop 28 to provide a first stage signal, and AND gate 32 will be opened, allowing the pulse from chain of five counter 27 to pass to trigger flip-flop 28, ending the input cycle.

FIG. 5 illustrates one possible wafer scanning device. Because the etched lines on the wafer may not be lined up in the optimum direction for scanning, the preferred embodiment has a system provided for automatically rotating the image of the etched indicia into an orientation appropriate for scanning. This image rotation can be done optically or it can be done by physically rotating the wafer.

In FIG. 5, light from a light source 41 is directed onto a wafer 40 at an angle. A dove prism 42 receives the light reflected from the wafer. Rotation of this prism causes rotation of the image emerging from the prism in a manner well known in the art. The light emerging from the prism passes through a lens 43 onto a rotating scanning mirror 44. Although, mirror 44 is shown as a flat mirror, it could be a multisurface mirror. For example, it could have an octagon cross section. The light from the scanning mirror passes through a narrow slit 46 into a chamber 45 to activate a photosensitive element 47.

Only when the lines of light, corresponding to the etched lines on the wafer, are received from scanning mirror 44 as lines oriented substantially parallel to slit 46 will the light through the slit onto element 47 flicker on and off to indicate the frequency caused by the spacing of the etched lines. In other orientations, some parts of more than one line of light may simultaneously appear through the slit, lessening or eliminating the frequency effect.

Thus, the full frequency effect will be received for only two orientations of the dove prism. These two orientations are 180° apart and correspond to scan in the correct direction and in the reverse direction.

The direction of the beam of light from source 41, when viewed from directly above the wafer, should be perpendicular to the etched lines for maximum illumination of the etched lines. Thus the light source 41 is arranged to be rotated with the prism. The relative orientation of the prism and light source is adjusted so that, for any position of the prism, any etched line on the wafer presented parallel to the slit is illuminated perpendicular to the etched line.

Although FIG. 5 shows a system including a rotating dove prism for optically rotating the image presented to the slit, this is shown by way of example only. One or more electro-optical crystals could be voltage-controlled to rotate the wafer image. In connection with any such nonmechanical image rotation a plurality of light sources could be controlled so that either direction of the single operating light source is controlled or so that the vector resultant direction of the apparent light source is controlled.

FIG. 6 illustrates another possible wafer scanning device in which image rotation is accomplished by physically rotating the wafer.

Light from light source 41 is directed onto wafer 40. The wafer is located on a platform 53 rotated by a motor 52. Light reflected from the wafer passes through lenses 50 and 51 to scanning mirror 44 which directs the light through slit 46 of chamber 45 onto photosensitive element 47. The correspondingly numbered parts have similar functions as in FIG. 5.

In the device of FIG. 6, the image is rotated by the physical rotation of the wafer. Other methods for physically rotating the wafer could accomplish the same results. For example, the wafer could ride on a cushion of air and be rotated by manipulation of the surrounding air pressure or motion.

FIG. 7 illustrates an additional kerf etching pattern for placement of indicia. In such a pattern, two primary changes are made from the pattern of FIG. 2.

First, the information is not frequency coded as in FIG. 2 but is contained in the presence or absence of etched lines in particular areas of the kerf. Thus, the pattern of FIG. 7 can contain the same amount of information in a smaller area of the kerf.

Second, the etched lines are placed at an angle other than perpendicular to the kerf area. Such placement greatly reduces the amount of interference from light reflected from the etched circuits in area 1. The greater part of the circuit lines are etched or applied either parallel to or perpendicular to the kerf areas. With incident light being directed perpendicular to the etched lines of indicia areas 60, there is maximum reflection from these etched lines. The incident light is generally not perpendicular to the circuit lines, which therefore allow reduced reflection.

FIG. 7*b* shows the idealized response of a photosensitive element such as element 47 to the lines of indicia areas 60. Various noise problems will cause a less than ideal response of such a photosensitive element. FIG. 7*c* illustrates a typical response to light from the indicia areas. An imperfection 61 in the oxide layer causes a spike 63 in the actual response curve. By comparison of the actual response of the photosensitive element with the clock signal of FIG. 7*d* the digits of FIG. 7*e* can be determined. Standard discrimination techniques can eliminate noise such as spike 63.

While the invention has been particularly shown and described with reference to preferred embodiments thereof, it will be understood by those skilled in the art that various changes in form and details may be made therein without departing from the spirit and scope of the invention.

We claim:

1. Means for identifying a piece of semiconductor material comprising:
   A. a kerf area on said piece of semiconductor material;
   B. a plurality of etched areas on said kerf area, said etched areas being arranged in a pattern corresponding to a numerical code;
   C. means for directing incident radiation onto said kerf area to cause said incident radiation to be reflected in differing degrees from the nonetched areas on said kerf area and from said etched areas on said kerf area; and
   D. means for detecting radiation reflected from the various etched and nonetched areas of said kerf area for determining if said various areas are etched or nonetched and for indicating said numerical code.

2. Means for identifying a piece of semiconductor material according to claim 1 wherein said means for detecting comprises:
   A. lens means for producing an image of at least part of said etched areas;
   B. means including a slit for passing part of said image;
   C. photosensitive means for receiving the part of said image passed by said slit; and
   D. scanning means for moving said image linearly across said slit.

3. Means for identifying a piece of semiconductor material according to claim 2 further comprising means for causing the image produced by said lens means to rotate.

4. Means for identifying a piece of semiconductor material according to claim 3 further comprising means for varying the direction of said incident radiation as said image is caused to rotate.

5. Means for identifying a piece of semiconductor material according to claim 1 wherein said etched areas comprise etched lines, said kerf area including a plurality of kerf area regions, comprising:
   A. at least one kerf area region of a first type in which said etched lines are spaced a first distance from each other; and
   B. at least one kerf area region of a second type in which said etched lines are spaced a second distance from each other whereby, the relative placement of regions of different types indicates said numerical code.

6. Means for identifying a piece of semiconductor material according to claim 1 wherein said kerf area includes a plurality of kerf area regions, comprising:

A. at least one kerf area region of a first type including etched areas; and

B. at least one kerf area region of a second type not including etched areas, whereby, the relative placements of regions of said first type and of said second type indicate said numerical code.

7. Means for identifying a piece of semiconductor material according to claim 1 wherein said etched areas comprise etched lines, and wherein said etched lines form an angle other than perpendicular with the edge of said kerf area, and further comprising means for directing said incident radiation at said etched areas in a direction perpendicular to said etched lines.

8. Means for identifying a piece of semiconductor material according to claim 5, further including at least two kerf area regions of a third type in which said etched lines are spaced a third distance from each other, said third type region being etched on both sides of a group of regions of said first and second type which corresponds to a numerical code.